Patented June 27, 1950

2,513,026

UNITED STATES PATENT OFFICE 2,513,026

AMINOALKYL SULFONYL PIPERAZINES AND PROCESS FOR PREPARING SAME

Robert Michel Jacob, Ablon-sur-Seine, and Edouard Suau, Choisy-le-Roi, France, assignors to Societe des Usines Chimiques Rhone-Poulenc, Paris, France, a French body corporate No Drawing. Application June 17, 1949, Serial No. 99,867. In France June 29, 1948

11 Claims. (Cl. 260—268)

This invention relates to aminoalkyl sulphonyl piperazines and more particularly to such compounds which have valuable physiological properties.

It is an object of this invention to provide new aminoalkyl sulphonyl piperazines and new processes for their manufacture. It is a further object of this invention to provide valuable aminoalkyl sulphonyl piperazines which are useful physiological products. Further objects of this invention will hereinafter appear.

According to the present invention new aminoalkyl sulphonyl piperazines having valuable physiological properties conform to the general Formula I:

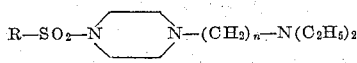

where $n$ is selected from 2 and 3 and R is selected from the class consisting of lower alkyl radicles, the benzene residue and lower-alkyl-substituted benzene residues. Suitable values for R are methyl, ethyl, phenyl, methylphenyl and ethylphenyl but alkyl groups of higher carbon content, e. g. up to 5 carbon atoms, may be employed.

According to a further feature of this invention compounds of general Formula I are produced by condensing an N-di-β-chlorethyl sulphonamide of the general Formula II:

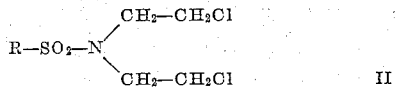

where R has the significance given above, with a compound of the general Formula III:

$$NH_2—(CH_2)_n—N(C_2H_5)_2 \qquad III$$

where $n$ has the significance given above.

According to yet a further feature of the invention compounds of general Formula I are produced by condensing a sulphonyl chloride of the general Formula IV:

$$R—SO_2Cl \qquad IV$$

where R has the significance given above, with a compound of the general formula:

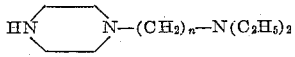

where $n$ has the significance given above.

The aminoalkyl sulphonyl piperazines thus obtained have valuable physiological properties and are particularly effective in treating states of traumatic or haemorrhagic shock.

The following examples will serve to illustrate the invention but are not to be regarded as limiting the invention in any way. Melting points were determined by the capillary method except where otherwise stated.

Example I

A mixture of 59.2 g. of N-bis-(β-chlorethyl)-p-toluenesulphonamide, M. P. 47° C., and 92 g. of N.N-diethylethylene diamine is heated under reflux for 1 hour. After cooling, the mixture is dissolved in 300 cc. of water and left to crystallise in the cold state. The crystalline product is separated by centrifuging and is washed in water, and then dried in vacuo in a desiccator in the presence of potash in pellet form. 63 g. of 1-p-toluenesulphonyl - 4 - β - diethylaminoethyl - piperazine, M.P. 50–51° C. are obtained. Its di-hydrochloride, after recrystallisation from alcohol, melts at 210–211° C. (on the Maquenne block).

Example II

By proceeding as in Example I but using 5 g. of N-bis-(β-chlorethyl)-benzene sulphonamide M. P. 47–48° C., and 8.7 g. of N.N-diethyl-1:3-propylene diamine, 1-benzenesulphonyl-4-γ-diethylaminopropyl-piperazine is obtained. This substance, after recrystallisation from cyclohexane, melts at 78–79° C.

Example III

An ethereal solution of 14.5 g. of 1-γ-diethylamino-propyl-piperazine is poured drop-by-drop into an ethereal solution of 9.3 g. of ethane sulphonyl chloride, with agitation and cooling. A pasty precipitate is formed, which turns slightly yellow. It is left for some time at room temperature, and then dissolved in water. Dilute sulphuric acid is added until the solution is just acid to Congo red. The acid solution is decanted and the residue is made alkaline with an excess of caustic soda (36° Bé.) and then extracted with ether. On evaporation of the ether from the extract obtained an oil is obtained which is rectified under reduced pressure. 13.7 g. of 1-ethane-sulphonyl-4-γ-diethylaminopropyl piperazine, which distils at 189–190° C. under a pressure of 1.5 mm. of mercury, is thus recovered. The corresponding picrate melts at 230–231° C. (on the Maquenne block).

The initial 1-γ-diethylaminopropyl piperazine may be obtained in good yield and in very pure condition by acid hydrolysis of the 1-benzene-sulphonyl-4-γ-diethylaminopropyl-piperazine referred to in Example II. This base distils at about 145° C. under a pressure of 27 mm. of mercury and its picrate melts at 240° C. (on the Maquenne block).

Example IV

By proceeding as described in Example III, but with 10.5 g. of 1-β-diethylaminoethyl piperazine and 7.3 g. of ethanesulphonyl chloride, 12.3 g. of 1 - ethanesulphonyl - 4 - β - diethylaminoethyl-piperazine are obtained. This substance distils at 158-159° C., under a pressure of 0.5 mm. of mercury and its picrate melts at 218-219° C. (on the Maquenne block).

The initial 1-β-diethylaminoethyl piperazine is readily obtained by acid hydrolysis of the 1-p-toluenesulphonyl-4-β-diethylaminoethyl piperazine referred to in Example I. This base distils at 131-132° C. under a pressure of 26 mm. of mercury and its picrate melts at 233° C. (on the Maquenne block).

Example V

By proceeding as in Example III, but with 13.3 g. of 1-γ-diethylaminopropyl piperazine and 7.6 g. of methane-sulphonyl chloride, 13.5 g. of 1-methanesulphonyl-4-γ-diethylamino - propyl piperazine, which distils at 164-165° C. under a pressure of 0.9 mm. of mercury, is obtained.

Example VI

By proceeding as described in Example III, but with 10.5 g. of 1-β-diethylaminoethyl piperazine and 6.5 g. of methanesulphonyl chloride, 12.7 g. of 1-methanesulphonyl-4-β-diethylaminoethyl piperazine, which distils at 155-155.5° C. under a pressure of 0.5 mm. of mercury, are obtained.

We claim:

1. Aminoalkyl sulphonyl piperazines of the general formula:

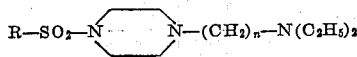

where $n$ is selected from 2 and 3 and R is selected from the class consisting of lower alkyl radicals, the benzene radical and lower-alkyl-substituted benzene radicals.

2. Aminoalkyl sulphonyl piperazines of the general formula:

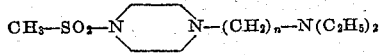

where $n$ is selected from 2 and 3.

3. Aminoalkyl sulphonyl piperazines of the general formula:

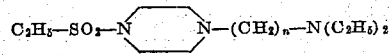

where $n$ is selected from 2 and 3.

4. Aminoalkyl sulphonyl piperazines of the general formula:

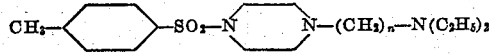

where $n$ is selected from 2 and 3.

5. 1-p-toluenesulphonyl-4-β-diethylaminoethyl piperazine.
6. 1-ethanesulphonyl-4 - β - diethylaminoethyl piperazine.
7. 1-methanesulphonyl-4-β- diethylaminoethyl piperazine.
8. 1-ethanesulphonyl-4-γ- diethylaminopropyl piperazine.
9. 1-methanesulphonyl-4-γ - diethylaminopropyl piperazine.
10. Process for the production of aminoalkyl sulphonyl piperazines of the general formula:

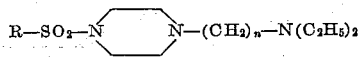

where $n$ is selected from 2 and 3 and R is selected from the class consisting of lower alkyl radicals, the benzene radical and lower-alkyl-substituted benzene radicals which comprises condensing a sulphonyl chloride of the general formula:

where R has the significance given above, with a compound of the general formula:

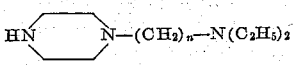

where $n$ has the significance given above.

11. Process for the production of aminoalkyl sulphonyl piperazines of the general formula:

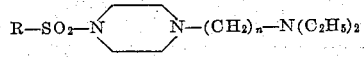

where $n$ is selected from 2 and 3 and R is selected from the class consisting of lower alkyl radicals, the benzene radical and lower-alkyl-substituted benzene radicals which comprises condensing a sulphonyl chloride of the general formula:

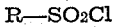

where R has the significance given above, with a compound of the general formula:

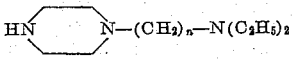

where $n$ has the significance given above, the said condensation and separation of the product being effected by mixing the reactants together in ethereal solution, dissolving the product in water, making the resulting solution acid, extracting the residue with ether, evaporating the ether from the extract and distilling the residue under reduced pressure.

ROBERT MICHEL JACOB.
EDOUARD SUAU.

No references cited.